United States Patent [19]

Chandra et al.

[11] 4,008,829

[45] Feb. 22, 1977

[54] RATIO CONTROLLED MIXING OF LIQUIDS

[75] Inventors: Rangasami Sarat Chandra, Davenport, Iowa; Kirby Lee Stone, Cincinnati, Ohio

[73] Assignee: Cincinnati Milacron, Inc., Cincinnati, Ohio

[22] Filed: Aug. 13, 1975

[21] Appl. No.: 604,342

Related U.S. Application Data

[63] Continuation-in-part of Ser. No. 501,743, Aug. 29, 1974, Pat. No. 3,908,862.

[52] U.S. Cl. .................................. 222/63; 222/134; 318/39; 318/571; 425/4 R
[51] Int. Cl.² ........................................... B67D 5/08
[58] Field of Search ................... 222/52, 55, 56, 57, 222/61, 63, 134, 135, 334; 425/4 R, 145, 166; 318/85, 39, 571; 91/189, 361, 362, 363 R, 363 A, 364

[56] References Cited

UNITED STATES PATENTS

| | | | |
|---|---|---|---|
| 2,658,644 | 11/1953 | Lowe | 222/135 X |
| 2,788,953 | 4/1957 | Schneider | 222/134 X |
| 3,741,441 | 6/1973 | Eberle | 222/135 |
| 3,908,862 | 9/1975 | Chandra et al. | 222/63 |

*Primary Examiner*—Robert B. Reeves
*Assistant Examiner*—Joseph J. Rolla
*Attorney, Agent, or Firm*—Daniel P. Worth

[57] ABSTRACT

Apparatus is described for the controlled mixing of liquids in a predetermined ratio and is especially suitable for the dispensing of predetermined ratios of polyol and polyisocyanate liquids in the liquid injection molding of polyurethane articles. The ratio control is achieved by a master-slave velocity relationship between at least two metering pumps of the plunger or piston type which are velocity coupled and inject on a common programmed velocity profile that is fed into the pump control that is the master system. Each pump control system has a velocity feedback control loop (a closed loop system) and one signal into the slave automatic control system (typically the polyol system) is obtained in a suitable ratio from the feedback master automatic control system (typically the poly isocyanate system).

8 Claims, 5 Drawing Figures

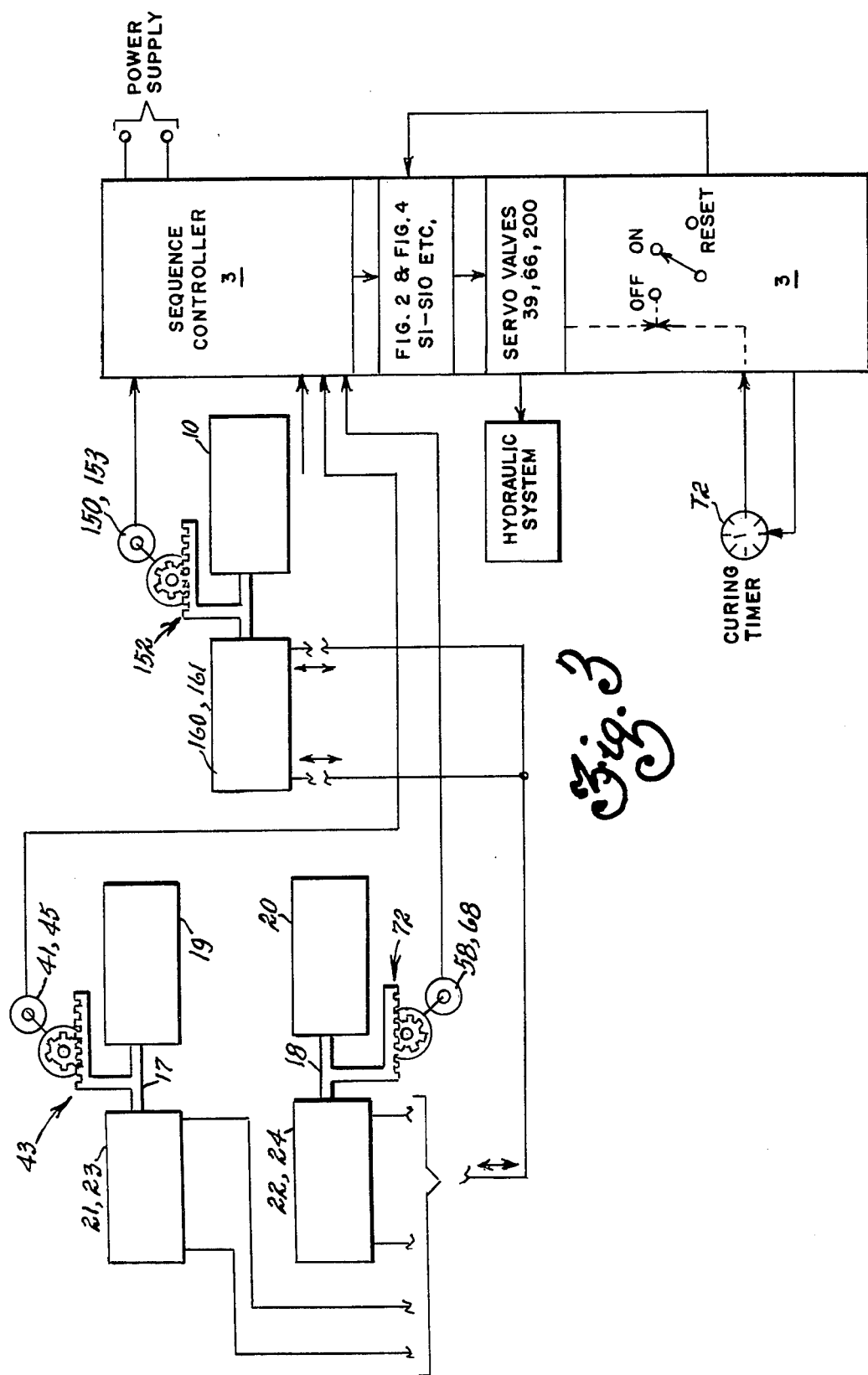

| SYSTEM PARAMETERS | SHOT PREP | PRE-PRESSURIZATION | INJECTION | CURING |
|---|---|---|---|---|
| BALL VALVE V1 | OPEN | | CLOSED | OPEN |
| BALL VALVE V2 | OPEN | | CLOSED | OPEN |
| BALL VALVE V3 | OPEN | | CLOSED | OPEN |
| BALL VALVE V4 | OPEN | | CLOSED | OPEN |
| (BY PASS) BALL VALVES 101,102 | CLOSED | | OPEN | CLOSED |
| SHOT POSITION 82 | OFF ON | | OFF | |
| SHOT POSITION 104 | OFF ON | | OFF | |
| INJ. TERMINATION POSITION 81 | OFF | | ON | OFF |
| INJ. TERMINATION POSITION 103 | OFF | | ON | OFF |
| MIX VALVE BOTTOM POSITION 145 | ON | | OFF | ON |
| MIX VALVE INJ. POSITION 147 | OFF | | ON | OFF |
| PRESSURE SWI. P1 | OFF | | ON | OFF |
| PRESSURE SWI. P2 | OFF | | ON | OFF |
| CURING TIMER | ON | | OFF | ON |

Fig. 4

| SYSTEM PARAMETERS | SHOT PREP | PRE-PRESSURIZATION | INJECTION | CURING |
|---|---|---|---|---|
| SERVO SWITCH S4A AND S4B | OFF | | ON | OFF |
| SERVO SWITCH S5 | OFF | ON | OFF | |
| SERVO SWITCH S6 | OFF | ON | OFF | |
| SERVO SWITCH S7 | ON | OFF | | ON |
| SERVO SWITCH S9 | ON | OFF | | ON |
| SERVO SWITCH S1000 | OFF | | ON | OFF |

*Fig. 5*

RATIO CONTROLLED MIXING OF LIQUIDS

SUMMARY AND BACKGROUND OF INVENTION

This is a continuation-in-part of our earlier application Ser. No. 501,743 filed Aug. 29, 1974, now U.S. Pat. No. 3,908,862 and entitled Ratio Controlled Mixing of Liquids and owned by a common assignee which is expressly incorporated herein (hereinafter referred to as the parent or parent case).

This invention relates to an improvement in apparatus for the ratio controlled mixing of liquids. One aspect of the invention relates to such apparatus having electrical automatic control loops for each of at least two liquids arranged in a master-slave relationship between the control loops. An aspect of the invention is automatic control apparatus using electrical feedback automatic control systems where the master system has a programmable velocity profile reference and provides from its own feedback loop a ratioed velocity signal to each slave control system that is representative of actual master velocity. The invention has particular application to the feeding and mixing of reagents that include polyol and isocyanate in the liquid injection molding of articles made of polyurethane composition in connection with which the present invention will now be described by way of example but not limitation.

Liquid feeding mixers having means to adjust the feed ratio of one or more liquids to another are known, as is taught in a large number of previously issued U.S. and foreign patents, of which U.S. Pat. Nos. 3,386,623 and 3,642,175 are generally representative. It is also known to feed such liquids using plunger or piston type metering pumps.

It is common practice in the prior art to feed the reagents for making polyurethane sequentially or one at a time into a mixing chamber. This, however, generates a number of difficulties such as requiring longer cycle time for molding operations and also requiring a longer shelf time or pot-life to avoid having the reagents set up in the mixing chamber. One of the features and advantages of the instant invention is to reduce cycle time by allowing the use of fast-reacting chemicals whereupon the cycle time can be substantially reduced.

More specifically, the invention comprehends an apparatus for feeding liquids in a preselected ratio from at least two separate sources, each having automatic control system arranged in a velocity coupled master and slave relationship to effectuate said ratio which includes: first and second positive displacement liquid feeding means (such as a plunger type metering pump or an expandable chamber device); first and second means for measuring the rate at which, respectively, each of said first and second liquid feeding means dispenses its respective liquid (such as an electric tachometer); first and second velocity feedback control system means, for automatically controlling said first and second liquid feeding means, respectively, by feeding back signals from, respectively, said first and second rate measuring means to a control summing junction in the respective control systems velocity ratio control means for receiving an input signal from said first rate measuring means and in response thereto producing as an output signal a ratioed master velocity signal having a preselected ratio to said input signal; velocity signal summing means for receiving and summing said ratioed master velocity signal and said slave velocity signal from said second feedback control system means to produce a feedback error signal; and means to conduct said feedback error signal to the aforesaid control summing junction in said second feedback control system means, whereby said slave velocity signal is summed twice to produce a slave control signal for controlling the velocity or rate at which said second or slave liquid feed means is operated.

Other objects, advantages and features will become apparent from a reading of the following specification in connection with the annexed drawings wherein:

FIG. 3 is a schematic diagram illustrating the sequencing and other automatic controls; and FIGS. 4 and 5 are timing charts explanatory of the operation of the apparatus illustrated schematically in FIGS. 1 and 2.

The drawings of the parent case are referred to for background, similarities, common components, and so forth. For convenience, reference numbers are used for various signals and should also be understood as referring to the transmission means, normally wires for electrical signals and conduits for pneumatic and hydraulic signals. Where possible, the same reference numbers as the parent are used unless a significant difference in function is intended in which case a different number will be used, commonly by adding 100 (e.g. 31V becomes 131V and 231V).

INTRODUCTION

Figure 1:
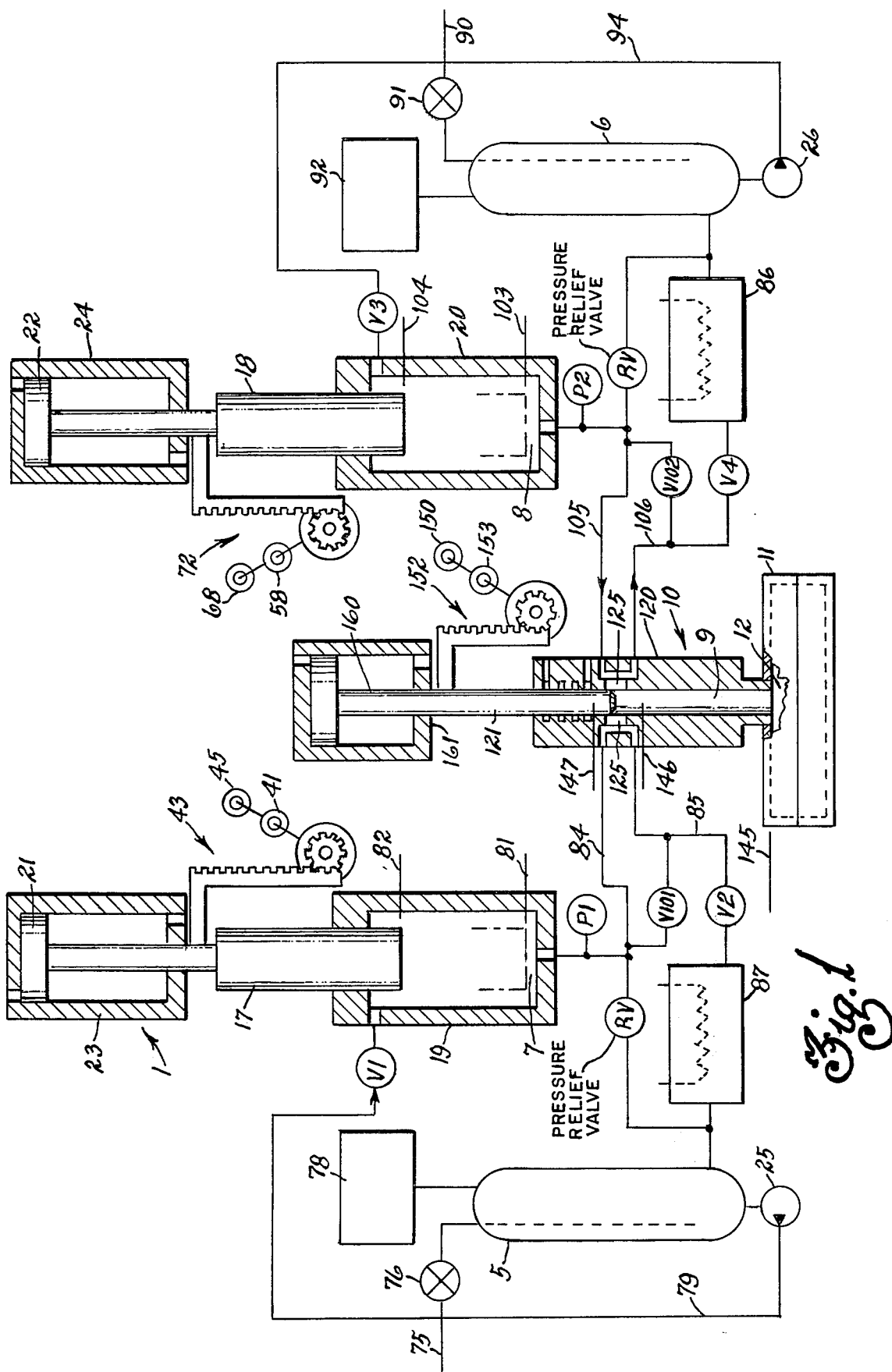
FIG. 1 is a schematic diagram of the overall system for handling and feeding liquids in a ratio.
Figure 2:
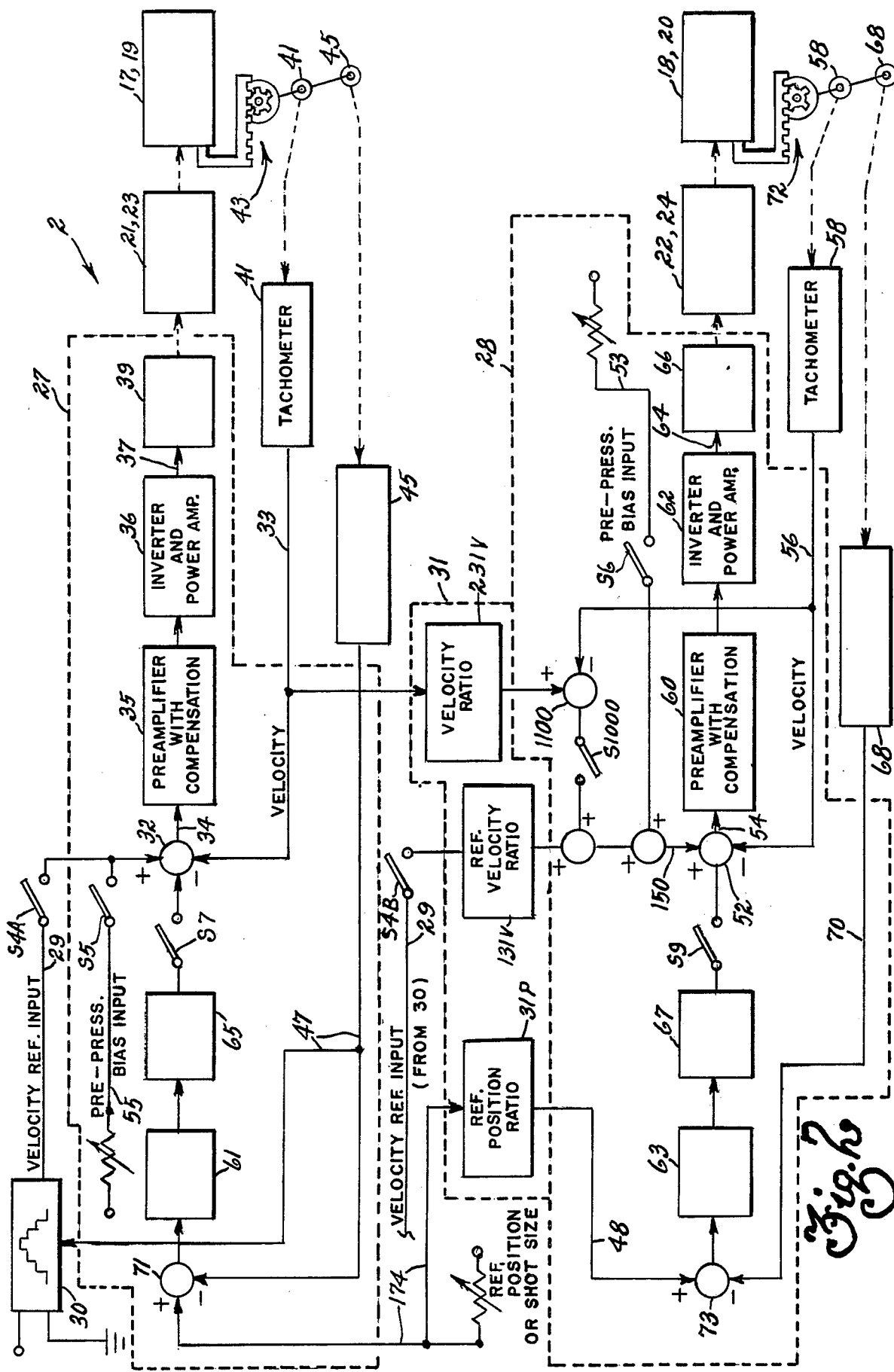
FIG. 2 is a schematic electrical control diagram explanatory of the velocity coupled ratio feeding system.

The present invention is directed primarily to the automatic control system 2 illustrated in FIG. 2, as applied to the molding of polyurethane articles to control the metering, mixing and injection system 1 of FIG. 1. The sequencing means 3 regulates the sequence of events as illustrated and described generally in FIGS. 3–5. The metering and mixing head details are as in the parent case.

The FIG. 1 system feeds polyisocyanate and polyol from reservoirs 5, 6 to individual metering chambers 7, 8 from whence they are removed to a chamber 9 in a mixing head 10 from which the mixture (after or during reaction) is injected directly into a mold 11. The reagents do not contact each other until they enter the mixing chamber 9 but once they have been mixed and partially reacted in chamber 9 they are injected into the mold 11, cured in well-known fashion, and a thermoset product 12 is then recovered.

The system of FIG. 1 is particularly well adapted to what is called liquid injection molding which handles reagents that are capable of very fast reaction such as the polyisocyanate an polyol used to form the polyurethane that is injected into the mold. Reaction times in the mixing head 10 to form gels are the order of about three seconds, the curing time in the mold is on the order of about two minutes, and a typical cycle time for molding an article weighing 15 pounds is about two minutes.

The metering or variable volume chambers 7, 8 of FIG. 1 are controlled by the system of FIG. 2 to deliver a preselected ratio of reagents e.g., a weight ratio of polyisocyanate to polyol. Preferably each metering chamber is a positive displacement liquid feeding means and is mechanically constructed to include a plunger or piston 17, 18 operating within a cylinder 19, 20 through a swept volume of preselected but variable or adjustable magnitude: each plunger preferably is directly driven by a hydraulic piston 21, 22 which is moved within its respective cylinder 23, 24 responsive to the control systems of FIGS. 2 and 3. Preferably a single stroke of each metering plunger 17, 18 in its respective cylinder completely exhausts the reagents therefrom and delivers that quantity of reagent into the mixing chamber 9.

The system of FIG. 1 is designed to keep the two reagents, e.g. isocyanate and polyol, from any contact with each other until they are delivered into the mixing chamber. The reagents are recirculated through the conduit paths described below during those times that they are not being delivered into the respective metering or measuring chambers.

The operations sequence of FIGS. 4 and 5 — including sequential control of the valving of FIG. 1 — is achieved by the control system of FIG. 3 to direct reagents at desired times to certain flow paths and/or to the metering cylinders and to cause delivery from such cylinders into the mixing chamber as will be further explained below. As will be explained in more detail below, the pumps 25, 26 operate continuously to feed an excess of each liquid to the chambers 7, 8 the excess being recirculated until such time as the valving V1–V4, V101 and V102 and mixing head 10 are operated to shut off recirculation and conduct a mixing and injection program.

The present invention controls the ratio of liquids delivered from the metering chambers 7, 8 of FIG. 1 by using the master-slave control system 2 of FIG. 2. The control system 27 is shown as the master, the control system 28 is illustrated as the slave, and ratio means 31 for establishing the ratio by which the slave is completed to or controlled by the master. This arrangement can be reversed to permit changing from polyisocyanate being master to where the polyol becomes the master and the polyisocyanate the slave. Sequence controller 3 (FIG. 3) can be constructed to reverse the master-slave relation by a simple switching scheme. The rapid advance chemical formulations, and the flexibility with which they can be applied have brought the art to the point where — for a given molding — either the isocyanate or polyol might be the master (or conversely, slave) depending on the reagent manufacture since each has his own formulation. For purposes of description the isocyanate will be the reagent in the master system. The system of FIG. 2 allows both of the metering plungers 17, 18 to be advanced simultaneously whereby their respective liquids are fed simultaneously to the mixing head 10. However, the velocity or rate at which the master liquid is forced out of its metering cylinder 7 is programmed on velocity programmer 30 in accordance with the velocity (i.e. rate) desired at each position at each increment of distance that the master (isocyanate) metering plunger 17 arrives at. Therefore, it can be said that this is a position coupled programmable velocity controlled ratio injection system for multiple component liquid injection molding.

The control system of FIG. 2 has a programmed velocity means 30 to drive both metering systems in a controlled fashion, but simultaneously. A ratio means 31 has the master-slave velocity ratio control means that includes a reference velocity ratio means 131V and a feedback velocity ratio means 231V to which are applied signals, respectively, from the programmed reference velocity signal source 30 and from the master velocity feedback loop 33. This improves the relationship of plungers 17, 18 during the time they advance and expel liquids. It also allows slave correction with reduced lag time over the system in the parent. The velocity coupling allows both to start and to continue to feed simultaneously.

THE RATIO CONTROL SYSTEM OF FIG. 2

This section is concerned with only the description of the ratio control system 2 of FIG. 2. Overall operation of the system is described in other sections of this specification and/or of the parent.

The FIG. 2 system allows the operator to set in these adjustments: the velocity profile in the programmed velocity means 30 (patch panel) and the ratios 31P, 131V, 231V in the ratio controller 31. The ratio of the velocity of master plunger 17 to that of slave plunger 18 is called the velocity ratio or control ratio. The ratio means 31 may conveniently comprise potentiometers in electrically separate circuits.

The FIG. 2 system includes first and second feedback control system means 27, 28 (the master and slave portions) for controlling their respective feeding means 17, 19 and 18, 20. Negative feedbacks are used for both the velocity 33, 56 and position feedbacks 47, 70.

Keep in mind that the master-slave system of FIG. 2 is enabled only during the time that the plungers 17, 18 in the metering cylinders are advancing and expelling the liquid therefrom and at other times is disabled. The sequence of other control functions of the system as a whole are taken care of by sequencing means 3 as in FIGS. 3–5. Similarly, the FIG. 2 system is sequenced by manipulation of the switch means S4A–S9, S1000 which are in turn enabled at the proper times by means described in connection with FIGS. 1, 3, 4, and 5.

The patch panel 30 is used to set in the programmed velocity or velocity profile whereby the master metering plunger 17 velocity is programmed for each of a series of positions of the master metering plunger 17. In handling polyurethane reagents, preferably the velocity profile of the isocyanate metering plunger 17 would be established by the operator on the patch panel.

The output signal 29 from the patch panel 30 is a reference velocity (for each master plunger position) which is fed forward to the control summing junction 32 for the master velocity feedback control system 27 and is also applied to velocity input terminal of the ratio controller 131V. The summing junction 32 is part of the velocity feedback system and as is well-known algebraically sums signals applied thereto, in this case sums the reference and feedback velocity signals 29, 33, respectively, to provide a control signal 34 which is then fed forward through a preamplifier 35, and power amplifier 36 means as control signal 37 to a servovalve 39 for controlling the hydraulic fluid admitted to the hydraulic cylinder 23 driving the master cylinder plunger 17 of FIG. 1.

The signal 33 representing feedback velocity may advantageously be obtained in well-known fashion by a means for measuring the rate of liquid feeding such as by an electric tachometer 41 driven off the rack and pinion system 43 secured to the plunger 17. The rack and pinion 43 also drives position sensor potentiometer 45 which generates signal 47 representing master cylinder plunger 17 position.

The ratio controller 31 is adjustable for the master/slave, eg. isocyanate/polyol, ratio and is used to operate the slave servo-system 28 for delivering polyol in a predetermined ratio to the isocyanate; each of the controller multipliers 231V, 31P, 131V is preferably a potentiometer but could be a computing amplifier designed for multiplying operations.

The master servo-system 27 applies the signal 33 representing master cylinder plunger velocity to velocity ratio means 231V of the ratio controller 31 and to the summing junction 32. The position interlock of the parent case is eliminated.

The slave system 28 of FIG. 2 is operated during shot preparation and curing steps from input signals consisting of — a position reference signal 174 is obtained from the position or shot size reference source common to both the master and slave systems; the reference signal 174 is applied to the position ratio means 31P which produces a ratioed signal representing the reference signal 174 and applies it to summing junction 73; and during injection the slave system receives the signal 150 from the two velocity ratio means 131V and 231V. This is the only input during this step (see FIG. 5) although the slave side has a velocity feedback 56 from tachometer 58. The reference velocity 29 is applied through switch S4B to velocity ratio means 131V and added to the signal received from switch S1000 which in turn is the algebraic sum of the signals applied to velocity summing junction 1100, respectively, being the feedback master velocity 33 after multiplication for ratio in means 231V and the feedback slave velocity 56. Summing junction 52 sums the signal 150 with the slave feedback injection velocity 56 to produce the control signal 54.

Bias input voltages 53, 55 are provided from a power supply to their respective summing junctions 52, 32 during the prepressurizing step of the cycle (FIGS. 2, 5). Their purpose is to cause slow initial advance of the metering plungers 17, 18 so that pressure builds up in the lines leading from the metering cylinders to the mixing cylinder. The pressure builds up until pressure switches P1 and P2 turn on (FIGS. 1, 4) which event signals the end of prepressurizing and initiates the actual injection phases. The bias voltages are applied to the system by closing switches S5 and S6 during the prepressurizing step: S5 and S6 are open at other times. During the injection step switches S4A and S4B are closed to apply the velocity reference input to the system.

A slave velocity feedback signal 56 from the slave electric tachometer 58 is applied to the feedback summing junction 52 and the velocity feedback summing junction 1100. The control signal 54 obtained by summing the inputs to junction 52 is applied through suitable preamplifying and power amplifying means 60, 62, respectively as control signal 64 to the hydraulic servo valve 66 for regulating the advance of the slave metering plunger 18.

The slave system 28 has a plunger position potentiometer 68 that generates signals 70 representing slave plunger 18 position.

A gain control 61, 63 and limiter 65, 67 are connected to each of the master and slave loops, respectively. A position feedback summing junction 71, 73 is provided to each of the master and slave loops, respectively. The shot size or position reference signal source 174 is connected to the summing junctions 71 and (via 31P) 73 the output signals from which are applied to the master and slave circuits, respectively, by closing switches S7 and S9 (FIG. 5) during the shot preparation and curing steps but not during the prepressurizing and injection steps when switches S7, S9 are open.

The velocity control signals for the FIG. 2 system are obtained preferably by liquid feed rate measuring means such as electric tachometers 41, 58 which are respectively associated with rack and pinion drives 43, 72 on the hydraulically driven metering plungers controlled by the FIG. 2 system. In similar and well-known fashion, potentiometers 45, 68 are each a distance measuring means driven by their respective rack and pinions to provide the requisite position feedback signals 47, 70. These position signals are also used in the sequencing control system of FIG. 3 to manipulate switches S4A-S1000 and to start and stop the advance and retraction of the respective metering plungers as will be described elsewhere herein.

SUPPLY, METERING, VALVING AND MIXING

FIG. 1 schematically illustrates the system 1 for feeding, metering, valving (note especially bypass valves V101, V102 and ball valves V1–V4 and pressure switches P1, P2) for controlling and mixing liquids. Isocyanate is fed into the master reservoir 5 through a supply line 75 and supply valve 76 from any suitable source such as a tank car, etc. The reservoir 5 is furnished with a supplemental pressurizing source 78 such as high pressure nitrogen supplied at a pressure of 3–5 psi. from any suitable source such as pressurized gas bottles, liquid nitrogen and vaporizer and pump, or the like.

The master metering cylinder system 17, 19 and the slave meter 18, 20 are preferably of the so-called lance design comprising a plunger that moves within a cylinder and has a substantial annular space, far greater than mechanical clearances, between the plunger and cylinder wall. Displacement from each cylinder is thus directly proportional to the volume displaced by the plunger when it is driven further into the cylinder or withdrawn from the cylinder. Furthermore, the plunger does not act to shut off the flow of liquids into the cylinders 19, 20 although the valves V1–V4 are closed to shut off flow through the respective metering cylinders at certain predetermined times, here the prepressurizing and injection steps (FIGS. 4, 5) and are opened during the shot prep and curing steps.

In the master and slave metering systems respective pumps 25, 26 deliver liquid polyisocyanate and polyol from the respective reservoirs 5, 6 into the feed lines 79, 94 which contain valves V1 and V3. As explained below, the valves V1 and V3 are operated in unison with V2 and V4 and are closed when it is desired to prevent any liquid from entering their respective cylinders and are open at those times when liquid is to be pumped through the respective cylinders. In this manner, there is continuous circulation of the respective liquids through their metering cylinders and circuit except for those specific times (prepressurizing an injection, see FIG. 4) when valves V1 and V3 are closed. Bypass valves V101, V102 are open when V1–V4 are closed and vice versa. Bypass valves V101, V102 provide a way to allow flow into mix head 10 for a short time after V1–V4 are closed by reverse flowing through line 85 until the mixing head ports 125 are covered by plunger 121 advancing to 146.

Liquid, upon leaving each metering cylinder (which occurs as each plunger is driven from its illustrated retracted position at 82, 104 toward its extended position 81, 103) enters a mixing head feed line 84, 105 which each include a pressure switch P1, P2 respectively. Each line 84, 105 directs liquid from its respective metering cylinder to the mixing head 10.

One of two events takes place at the mixing head: each liquid is directed from its feed line 84, 105 into the mixing chamber 9 for contact with the other liquid (or liquids if more than two are being mixed) or the control elements V1–V4 and plunger 121 prevent mixing and instead recirculate each liquid to its respective liquid reservoir 5, 6 through (for polyisocyanate) a recirculation line 85–106 that includes therein a control valve V2 (V4 for polyol) which is preferably a ball valve. A heat exchanger 86, 87 to control the temperature of the returned liquid reagent is preferably also located in each recirculation line.

It will be appreciated that the pumps 25, 96 pump an excess of liquid into their respective chambers 7, 8 until chambers 7, 8 and conduits connected thereto are filled with liquid. The volume that is displaced when the plungers 17, 18 are advanced and which, therefore, are the quantities fed into the mixing head 10.

MIXING HEAD CONSTRUCTION

We did not invent the mixing head structure. The mixing head may be as described in our parent case and preferably is: additional details of construction and usage are in the concurrently executed and filed Application Ser. No. 501,668 by, now U.S. Pat. No. 3,912,234, John Peter and assigned to the same assignee. At the heart of this structure is a plunger 121 slidably fitted into a bore and having the mixing slots 125 manifolded to receive the respective liquids and to cause streams of each to impinge on each other within the cylinder.

OPERATION AND AUTOMATIC CONTROLS

Referring first to FIG. 1 and 3, the reader's attention is drawn to the following important control elements: control valves V1–V4; bypass valves V101, V102; position indicating potentiometers 45, 68, on the respective metering cylinders for indicating the positions of the metering plungers 81, 82 and 103, 104 which are indicated by signals off potentiometers 45, 68; the mixing head potentiometer 150 for indicating plunger 121 positions shown as bottom 145, preinjection 146 and mixing 147; pressure switches P1 and P2; and in FIG. 3 curing timer T2. These in addition to the ratio control system of FIG. 2. All of these potentiometers (for position or distance) and likewise electrical tachometers 41, 58 and (mixing plunger) 153 are driven off rack and pinions 43, 72, 152.

The timing card of FIGS. 4 and 5 shows when these various elements are enabled an disabled.

The plunger 121 has three positions indicated as 145, 146, 147 which respectively indicate first, slot 125 blocking but fully advanced; second, partially retracted and still blocking the mixing slots; and third, fully retracted unblocking the slots 125 to permit mixing. These three positions are controlled by the automatic control system of FIGS. 3 and 4, explained below.

It should be understood that the several respective key potentiometer positions 81–147 inclusive can be realized by proximity or limit switches as well as by potentiometers. However, rack and pinion driven potentiometers are preferred for metering plungers 17, 18 and limit switches are preferred for plunger 121 position — all are readily available commercial items.

The velocity signals required for the FIG. 2 system can be realized either from electric tachometers driven in unison with the position potentiometers or by computing from distance and time measurements.

The overall sequence has four major routines as further outlined on FIGS. 4, 5: shot preparation; prepressurization; injection; and curing. This overall sequence as well as the sub-routines involved in each of the major operations is controlled by the sequence controller 3 illustrated schematically in FIG. 3. The sequence controller 3 may be of any commerically available type such as a Programmable Controller Model No. 184-1 manufactured by te Modicon Corporation of Andover, Massachusetts. When the controller is energized by turning it on, it starts up the chemical and hydraulic pumps 25, 26 and 173 (FIG. 1, 8) and initiates the shot preparation routine by closing switches S7, S9 (FIGS. 2, 5) thus enabling, respectively, the position servos; which receive reference signals representing preselected end positions (of plungers 17, 18) that are applied to the position feedback summing junctions 71 and 73.

The various solenoid ball valves V1 through V4 are opened at this time and bypass valves V101, V102 are closed.

Servo-valves 39, 66, and solenoid 200 (FIGS. 2, 3) control, respectively, the hydraulic fluid flow to the hydraulic piston and cylinder assemblies 21, 23; 22, 24; and the mixing head piston and cylinder 160, 161. The hydraulic system is as shown in the parent case especially FIG. 8 mutatis mutandis. The former two (39, 66) are caused to operate so that during shot preparation the master and slave plungers are both retracted fully to the solid line positions 82, 104 as illustrated in FIG. 1. At the same time, the mixing head plunger 121 is fully advanced to the position 145 (FIGS. 1, 5) whereby all of the mixing sots 125 are blocked by the plunger 121 and the end of which preferably is flush with the mold face. While the mixing head plunger 121 is fully advanced to the position 145 (and also 146), all of the mixing slots 125 are blocked by the plunger 121 and therefore the recirculation path through the return ball valves V2, V4 to the reservoirs 5, 6 being open, the fluid flows through them continuously until the end of the shot preparation step at which time the prepressurizing step begins.

Prepressurizing brings the master and slave liquid systems up to certain threshold pressures before mixing and/or injection is allowed to take place. Simply stated, this involves controller 3 opening switches S7 and S9; shutting off the recirculation paths by closing valves V1, V2, V3, V4; opening bypasses V101, V102; and then closing switches S5 and S6 (FIGS. 2, 5) to apply the prepressurizing bias voltages 53, 55 to servovalves 39, 66 of the master and slave hydraulic cylinders to drive their plungers forward. During this interval, since all paths except bypasses V101, V102 are blocked by closed V1–V4, fluid pressure builds up until respective threshold pressures are reached at pressure switches P1 and P2 which closes switches P1 and P2 (FIG. 4); closing of P1 and P2 opens respectively, switches S5 and S6 (FIGS. 2, 5). This signifies the master and slave liquids are now up to pressure and ready to be mixed and therefore the end of prepressurizing and beginning of injection. Prepressurizing also involves partially retracting the mixing head plunger 121 to the postion 146: this still blocks the mixing slots but moves the plunger 121 to a position much closer to the slot unblocking position, whereby an extremely short motion (to retracted position 147) and extremely short time will be required to unblock the slots 125 and initiate mixing.

As to the injection step: th prepressurizing ends with the mixing plunger 121 partially retracted and the system under pressure upstream and the pressure switches P1 and P2 closed, the two pressure switches sense reaching threshold pressure and signal the end of prepressurizing and beginning of injection: the controller 3 responds to such threshold pressure signals fully and commands the retraction of the mixing plunger 121 and also starts a delay timer. The delay timer allows the mixing plunger 121 sufficient time to start unblocking ports 125 before closing switches S4A, S4B, and S1000 which start the rapid advance of the plungers 17 and 18; this improves the initial mixing of the components. The resulting motion of the mixing plunger to its command to open unblocks the ports 125 very rapidly and allows the two materials to come out through their slots 125, mixing intimately and reacting in the chamber 9. In the meantime, the plungers 17, 18 are advanced to feed their respective chemicals and they drive fully and rapidly to their most advanced in positions 81, 103 thereby metering selected volumes into the mixing chamber 9. As indicated on FIGS. 4, 5 the ball valves V1–V4 are all closed at this time and the pressure switches P1, P2 have now been disabled and will remain that way until the next prepressurizing step.

As can be appreciated, the injection step includes mixing by the impingements of the jets out of slots 125 on each other. Injection also involves getting charges of material out of the master and slave cylinders 7, 8 into the mixing chamber 9 and then removing them from mixing chamber 9 by the rapid advance of the plunger 121 before those chemicals can cure or otherwise solidify. At the end of prepressurizing and beginning of injection plungers 17, 18 advance at rates commanded by velocity reference 30 and controller 3 responds to plunger 17 and 18 reaching their full advanced positions 81 and 103 by driving the mix head plunger 121 from full retract 147 to its most advanced position 145. The plungers 17 and 18 are advanced at commanded injection rates for a fixed delay time after the plunger 121 closes the orifices 125 before stopping the movement of the plungers 17, 18. This improves the final mixing of the components. This signifies the end of injection.

Preferred operation requires closing orifices 125 completely with plunger 121 before plungers 17 and 18 are stopped. The excess liquids thus entering lines 84 and 105 are returned to reservoirs 5, 6 by the opening of pressure responsive relief valves R1 and R2 (FIG. 1) in response to the pressure buildup resulting from metering plungers 17, 18 overriding the closing of slots 125.

At this time, the curing routine is begun and the curing timer takes over and holds the plunger 121 at position 145 for a predetermined period of time sufficient to maintain pressure on the reaction product to fill mold cavity 12 until the reaction products have solidified.

The curing timer takes over on command of controller 3 to cool the now-molded article sufficiently to allow its removal from the mold and applies cooling water or the like to the mold assembly 11 so that the curing hardening step is thereby completed. After the curing step the system begins to reset itself by opening the various solenoid ball valves, retracting the metering plungers to positions 82, 104 and maintaining the plunger 121 in its advanced position 145. The system is then ready to repeat the shot preparation step, again under the overall guidance of the controller 3 and in parallel with the cooling phase.

RATIO CONTROL SYSTEM OPERATION

During the injection step, the ratio control system of FIG. 2 operates to advance the metering cylinder plungers 17, 18 in unison to positions 81, 103 and force a quantity from each system into the mixer equal to the swept volume in the respective chambers 7, 9. The mixer 10 contemperaneously begins this step with its plunger 121 at the mid or short stroke position 146 but is promptly retracted fully to 147 to open the mixing slots 125 when the treshold pressures are signalled by pressure switches P1, P2.

As shown in FIGS. 4, 5 when the injection step begins the switches S1000, S4A, S4B, S5, S6, S7, S9 are off or open. Shortly after the injection step starts, S5, 6, 7, 9 remain open and S4A, S4B, S1000 are closed and the reference velocity signal is fed from source 30 forward into the master (eg. isocyanate) feedback control system summing junction 32 and the reference velocity ratio controller 131V. Reference velocity signals from S4B through the ratio controller 131V begin advancing the slave control metering plunger by actuation of its hydraulic motor (eg. for polyol) 22, 24. In the meantime, of course, the master plunger 17 is advanced. The mixing plunger 121 after both (1) full retract to position 147 and (2) after the metering plungers fully advance, moves sharply fully forward to 145 thereby to rapidly inject. Injection is at this point complete and the curing step begins.

While both metering plungers move through their strokes, the feedback control system for each feeds its respective velocity signals 33, 56 from the electrical tachometers 41, 58. The slave system 28 feeds back velocity signals 56 to summing junction 1100 to add to the master velocity signals feedback 33 but ratioed in multiplier 231V. The sum from 1100 is then algebraically added to the ratioed reference velocity out of 131V (to form signal 150) and to signal 56 again at summing junction 52 to produce a coupling or corrective signal to control the velocity or rate at which slave plunger 18 is driven. A plurality of summing junctions are shown ratio means 131V, 231V and junction 52, which is one way to construct the circuit and facilitates explanation: however, a single junction 52 could be provided and have applied thereto ratio signals 131V, the velocity feedback slave signal from 1100 via S1000, feedback 56, and bias input 53 via 56.

The manner in which each hydraulic servosystem is manipulated, including the transducing of signals, is well-known and involves stepping up each electrical signal to a suitable power level (preamplifiers 35, 60 and inverters etc. 36, 62), transducing it to a corresponding hydraulic signal in a hydraulic servovalve 39, 66, and regulating the admission of hydraulic liquid into the hydraulic cylinders 23, 24 and into the mixing head cylinder 161 as further described below.

The control system of FIG. 2 is reset by opening switches S4A, S4B, S1000 and S5, S6 and by leaving closed S7, S9.

The various switches, S4A-S9 and S1000 are preferably relays the coils of which are energized by the controller 3.

HYDRAULIC SYSTEM

FIG. 8 of the parent case is used for this.

What is claimed is:

1. Apparatus for feeding liquids in a preselected ratio from at least two separate sources each havng an automatic control system arranged in a velocity coupled master and slave relationship comprising:
   a. first and second positive displacement liquid feed means;
   b. first and second means for measuring the velocity at which, respectively, each of said first and second liquid feed means dispenses its respective liquid;
   c. first and second velocity feedback control system means, for automatically controlling said first and second liquid feed means, respectively, by feeding back signals from, respectively, said first and second velocity measuring means to a control summing junction means in each respective control system for producing a control signal;
   d. velocity ratio control means for receiving an input signal from said first velocity measuring means and in response thereto producing as an output signal a ratioed master velocity signal that has a preselected ratio to its corresponding said input signal; and
   e. velocity signal summing means for receiving and summing said ratioed master velocity signal and said slave velocity signal from said second feedback control system means to produce a feedback error signal; and
   f. means to conduct said feedback error signal to the aforesaid control summing junction means in said second feedback control system means,
   whereby said slave velocity signal is summed twice to produce a slave control signal for controlling the velocity at which said second or slave liquid feed means is operated.

2. Apparatus according to claim 1, wherein:
   a. said first and second velocity measuring means are each an electrical tachometer providing a signal representative of the rate with which each said liquid is fed by said feeding means.

3. Apparatus according to claim 1, wherein:
   a. said first and second positive displacement means each comprises a plunger reciprocable within a cylinder and a servovalve to control reciprocation of said plunger; and
   b. said first and second velocity measuring means each measures the velocity of its said plunger.

4. Apparatus according to claim 3, wherein each of said velocity measuring means includes an electrical tachometer providing an output signal which is representative of the velocity at which the plunger associated therewith has moved.

5. Apparatus according to claim 1, further comprising within said second feedback control system means a slave reference velocity means to apply to said velocity summing means therewithin a signal representing the reference velocity for said second feed means, whereby said slave control signal comprises the composite sum of said ratioed master velocity signal, twice said slave velocity signal, and said reference velocity for said second feed means.

6. Apparatus according to claim 5, further comprising:
   a common source for providing a velocity reference signal;
   a reference velocity ratio multiplier within said slave reference velocity means, means for conducting output signals from said common source to an input of said multiplier and to said velocity summing means of said first feedback control system, the output from said multiplier being applied to said velocity signal summing means whereby slaving is achieved from reference signals and from velocity feedback signals.

7. In combination with apparatus for mixing first and second liquids each fed from a respective source in a predetermined ratio to each other wherein the apparatus comprises:
   first and second liquid feeding means,
   a mixing head connected to and receiving liquids from both said first and second feeding means and having,
   an expandable chamber into which streams of said liquids are directed into contact with each other,
   means to admit and prevent liquids admission into said chamber and to force the liquids therein out of the chamber;
   conduits connecting each of said liquid sources to a respective one of said feeding means and to said mixing head;
   a valve located in each conduit between the respective source and feeding means; and
   a valve in each conduit between said mixing head and said its respective source;
   a control system which comprises:
   means to control the velocity at which said second feeding means delivers its liquid in slaved ratio response to the velocity at which said first feeding means delivers its respective liquid including first and second means for measuring the velocity at which, respectively, each of said first and second liquid feeding means dispenses its respective liquid and further having
   i. velocity ratio control means for receiving an input signal from said first velocity measuring means and in response thereto producing as an output signal a ratioed master velocity signal that has a preselected ratio to its corresponding said input signal; and
   ii. means to sum output signals from (i) and the second velocity measuring means to produce an error signal; and
   iii. means to sum output signals from (ii) and the second velocity measuring means,
   and a recirculation system to allow each of said liquids to return to its source unmixed with the other liquid when said valves are open and said mixing head means to admit and prevent is positioned to prevent liquid admission.

8. Apparatus according to claim 7, further including bypass valve means connected between each feeding means outlet to a point upstream of the valve in the conduit between said mixing head and its source.

* * * * *